United States Patent
Fox et al.

(10) Patent No.: US 12,172,612 B2
(45) Date of Patent: Dec. 24, 2024

(54) AXLE ASSEMBLY HAVING A DIFFERENTIAL BRAKE

(71) Applicant: ArvinMeritor Technology, LLC, Troy, MI (US)

(72) Inventors: Jeremy S. Fox, Troy, MI (US); Robert Martin, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/447,438

(22) Filed: Aug. 10, 2023

(65) Prior Publication Data

US 2023/0382356 A1 Nov. 30, 2023

Related U.S. Application Data

(62) Division of application No. 17/713,317, filed on Apr. 5, 2022, now Pat. No. 11,840,205.

(51) Int. Cl.
*B60T 1/06* (2006.01)
*B60K 17/16* (2006.01)
*F16D 55/22* (2006.01)
*B60K 1/00* (2006.01)

(52) U.S. Cl.
CPC ........ *B60T 1/062* (2013.01); *B60K 2001/001* (2013.01); *B60K 17/165* (2013.01); *F16D 55/22* (2013.01)

(58) Field of Classification Search
CPC . B60T 1/062; B60K 17/165; B60K 2001/001; F16D 55/22
USPC .......................................................... 475/150
See application file for complete search history.

(56) References Cited

U.S. PATENT DOCUMENTS

| | | | |
|---|---|---|---|
| 4,856,373 A | 8/1989 | Washizawa | |
| 6,318,535 B1 | 11/2001 | Herffurth et al. | |
| 8,702,544 B2 * | 4/2014 | Tamai | B60K 6/365 475/5 |
| 2012/0283061 A1 * | 11/2012 | Karlsson | H02K 7/006 475/150 |
| 2019/0017578 A1 | 1/2019 | Hendrickson et al. | |
| 2019/0054816 A1 | 2/2019 | Garcia et al. | |
| 2019/0219142 A1 | 7/2019 | Chemelli | |
| 2021/0261111 A1 | 8/2021 | Hubertus et al. | |
| 2022/0389997 A1 | 12/2022 | Lee et al. | |

FOREIGN PATENT DOCUMENTS

| | | |
|---|---|---|
| DE | 828639 C | 1/1952 |
| DE | 102020109116 B3 | 9/2021 |
| JP | S57186560 A | 11/1982 |

OTHER PUBLICATIONS

Extended European Search Report dated Aug. 25, 2023 for related European Appln. No. 23158412.9; 18 Pages.
Brazilian Preliminary Office Action dated Apr. 15, 2024 for Brazilian Application No. BR102023005955-4; 6 pages.

* cited by examiner

*Primary Examiner* — Colby M Hansen
(74) *Attorney, Agent, or Firm* — Brooks Kushman PC

(57) ABSTRACT

An axle assembly having a differential assembly, a drive pinion, and a differential brake. The differential assembly may be rotatable about a differential axis. The drive pinion may mesh with a ring gear of the differential assembly. The differential brake may be operable to apply a brake torque to inhibit rotation of the differential assembly.

20 Claims, 3 Drawing Sheets

AXLE ASSEMBLY HAVING A DIFFERENTIAL BRAKE

CROSS-REFERENCE TO RELATED APPLICATIONS

This application is a division of U.S. application Ser. No. 17/713,317, filed Apr. 5, 2022, the disclosure of which is hereby incorporated in its entirety by reference herein.

TECHNICAL FIELD

This relates to an axle assembly that has a differential brake.

BACKGROUND

An axle assembly having a differential assembly is disclosed in U.S. Patent Publication No. 2019/0054816.

SUMMARY

In at least one embodiment an axle assembly is provided. The axle assembly includes a differential assembly, a drive pinion, a connecting shaft, and a differential brake. The differential assembly is rotatable about a differential axis and has a ring gear. The drive pinion meshes with the ring gear and is operatively connectable to a torque source. The connecting shaft is spaced apart from the differential assembly and rotatably connected to the drive pinion. The differential brake is operable to apply a brake torque to inhibit rotation of the connecting shaft and the differential assembly.

The connecting shaft may be rotatable about an axis. The axis may be disposed substantially perpendicular to the differential axis. The connecting shaft may be rotatable with the drive pinion. For instance, the drive pinion and the connecting shaft may be rotatable about an axis.

The differential brake and the drive pinion may be positioned on opposite sides of the differential assembly.

A rotatable braking component may be rotatable with the connecting shaft. The rotatable braking component may have a friction surface. The differential brake may have a friction member. The friction member may be engageable with the friction surface to provide the brake torque. The drive pinion, the connecting shaft, and the rotatable braking component may be rotatable together about an axis.

The axle assembly may include a housing assembly. The differential assembly may be received inside the housing assembly. The differential brake may be disposed outside of the housing assembly.

The connecting shaft may be rotatably supported by a bearing assembly. The bearing assembly may be disposed on the housing assembly. The bearing assembly may be disposed opposite the drive pinion.

The housing assembly may include an axle housing. The axle housing may have a center portion that receives the differential assembly. The axle housing may have first and second arm portions. The first and second arm portions may extend in opposite directions from the center portion. The first and second arm portions may each receive an axle shaft. The first and second arm portions may each support a wheel hub and a brake assembly that is configured to brake the wheel hub.

In at least one embodiment an axle assembly is provided. The axle assembly includes a differential assembly, a drive pinion, a second drive pinion, and a differential brake. The differential assembly is rotatable about a differential axis and has a ring gear. The drive pinion meshes with the ring gear and is operatively connectable to a torque source. The second drive pinion meshes with the ring gear. The differential brake is operable to apply a brake torque to inhibit rotation of the second drive pinion and the differential assembly.

The second drive pinion may be rotatable about an axis. The axis may be disposed substantially perpendicular to the differential axis. The drive pinion and the second drive pinion may be rotatable about an axis. The drive pinion and the second drive pinion may be disposed on opposite sides of the differential axis.

The torque source and the second drive pinion may be positioned on opposite sides of the differential assembly. The torque source may be an electric motor. The electric motor may have a rotor. The drive pinion and the rotor may be rotatable about an axis. The second drive pinion may be positioned on an opposite side of the differential assembly from the electric motor and the drive pinion.

A rotatable braking component may be rotatable with the second drive pinion. The rotatable braking component may have a friction surface. The differential brake may have a friction member. The friction member may be engageable with the friction surface to provide the brake torque. The rotatable braking component may be a brake rotor. The friction member may be a brake pad assembly. The rotatable braking component may be mounted to the second drive pinion. The rotatable braking component may be disposed outside of the housing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
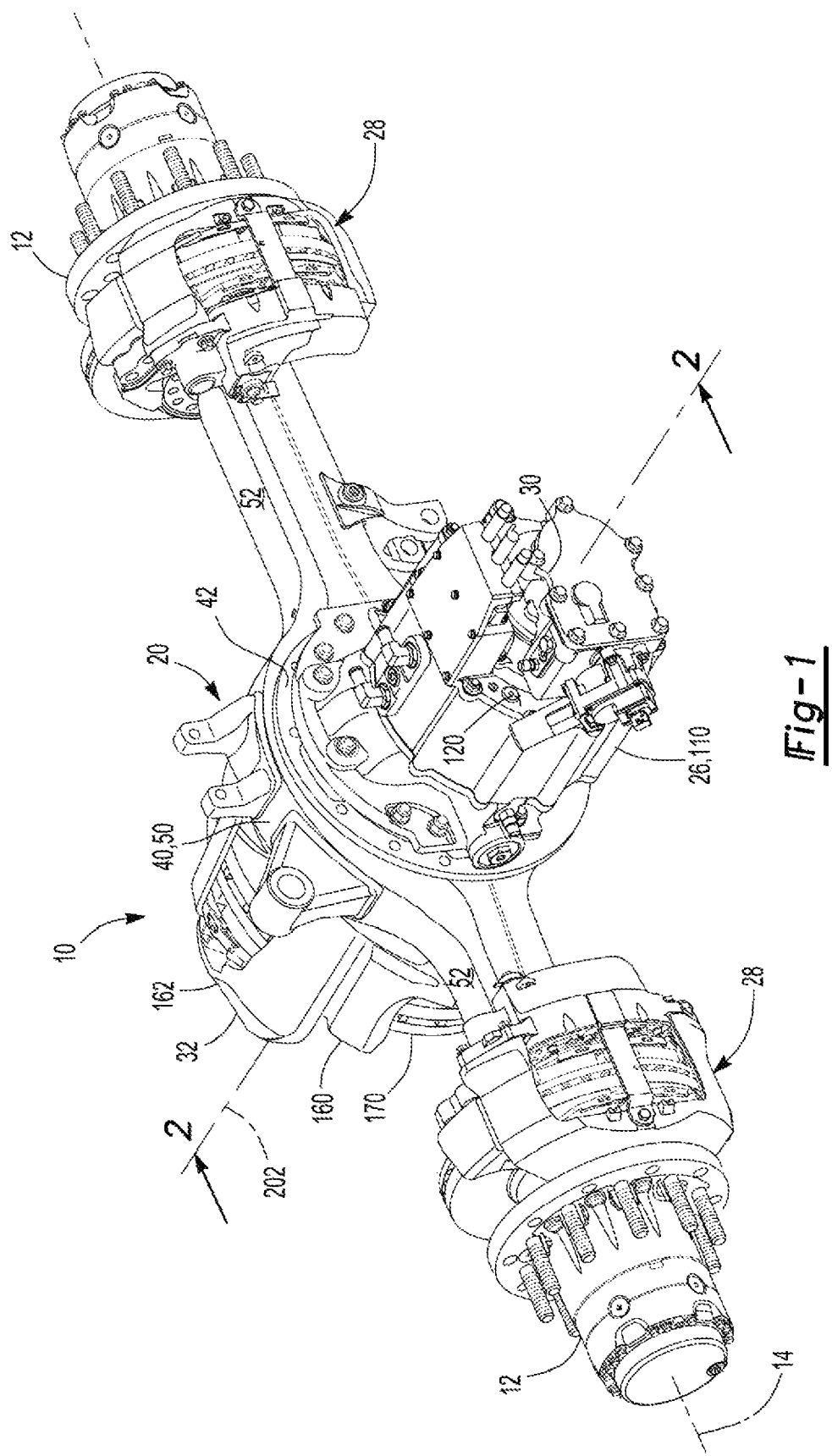
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub 12 that may be rotatable about a wheel axis 14.

One or more axle assemblies may be provided with the vehicle. As is best shown with reference to FIGS. 1 and 2, the axle assembly 10 may include a housing assembly 20, a differential assembly 22, and at least one axle shaft 24. The axle assembly 10 may also include or may be connected to a torque source 26 and may include one or more brake assemblies 28, which are best shown in FIG. 1. As is best shown in FIG. 2, the axle assembly 10 may include a gear reduction module 30 and a differential brake 32.

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

Figure 2:
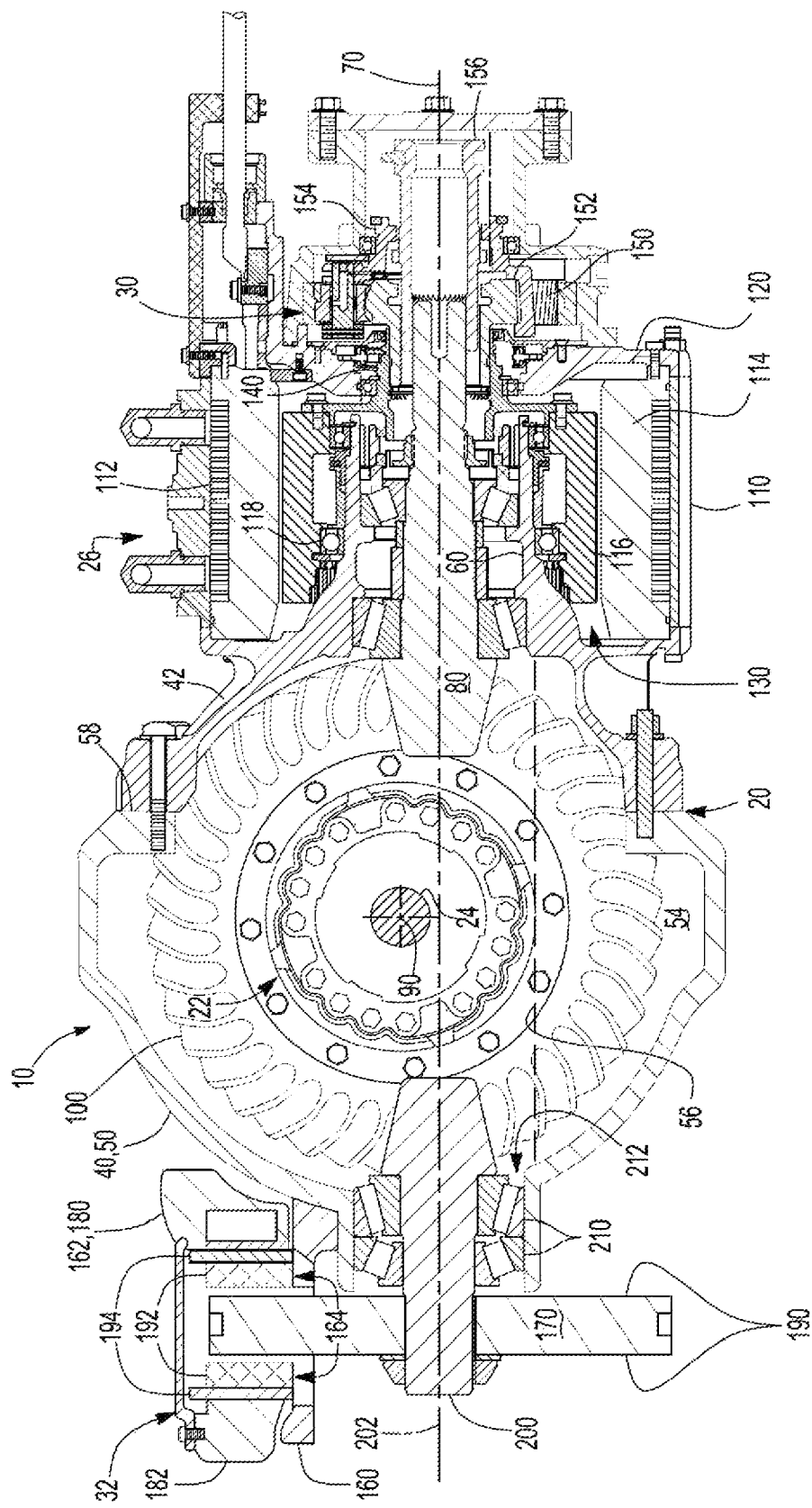
FIG. 2 is a section view of a first configuration of the axle assembly along section line 2-2.
Figure 3:
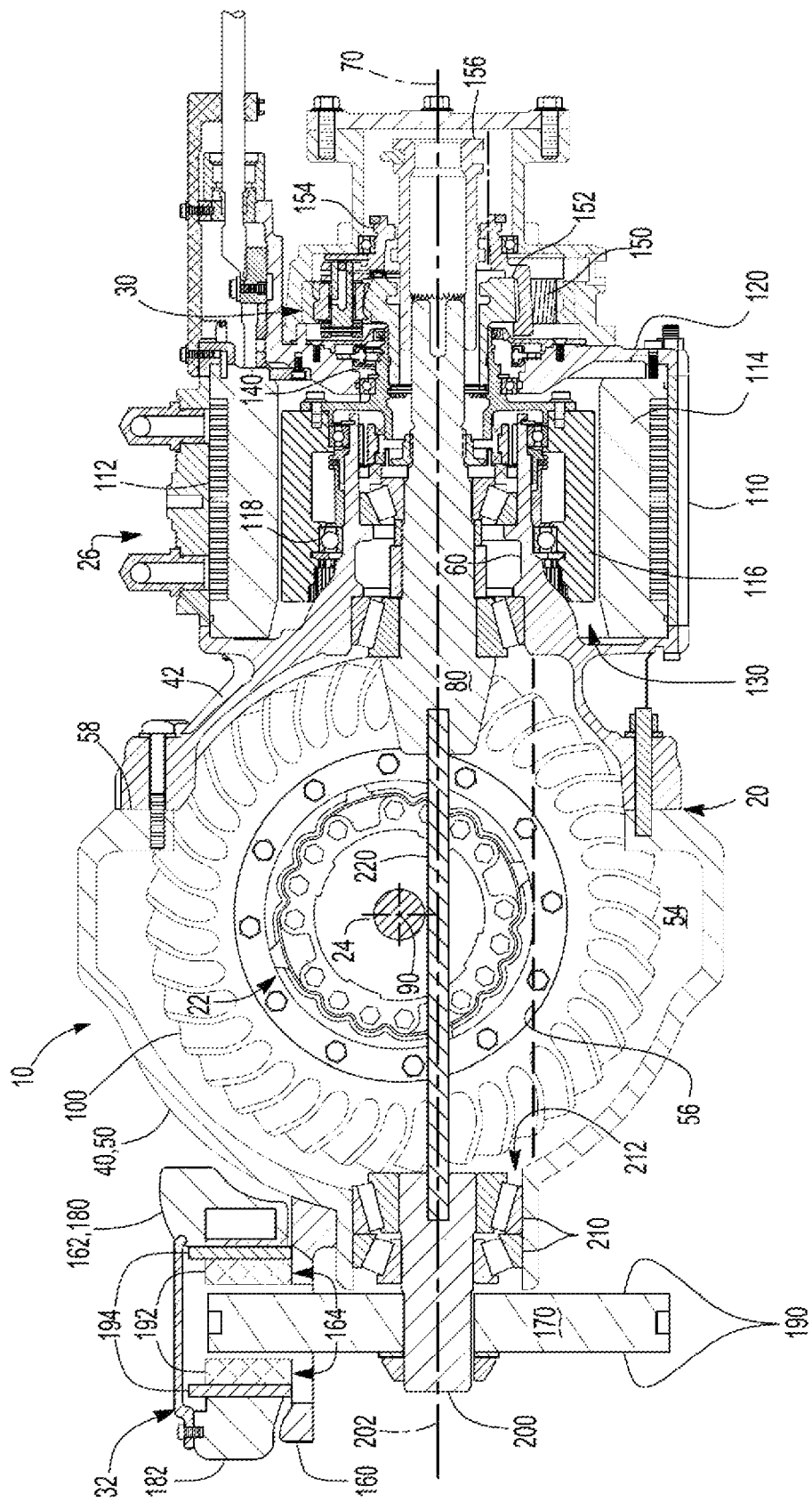
FIG. 3 is a section view of a second configuration of the axle assembly along section line 2-2.

The axle housing 40 may receive and may support the axle shafts 24, an example of which is best shown in FIGS. 2 and 3. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 and distributed to lubricate various components.

The center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt or stud, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. Each arm portion 52 may support a wheel hub 12 and a brake assembly 28 that is configured to brake the wheel hub 12 and hence brake a wheel that is mounted to the wheel hub 12. The brake assembly 28 may be of any suitable type, such as a disc brake or a drum brake. In addition, the brake assembly 28 may be actuated in any suitable manner, such as being hydraulically actuated, electrically actuated, or the like. Moreover, it is contemplated that the brake assembly 28 may provide brake torque when power is not provided to the brake actuator (e.g., braking torque is provided when the brake actuator is off and powering the brake actuator terminates braking). An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22. For example, the differential carrier 42 may include one or more bearing supports that may support a bearing like a roller bearing assembly that may rotatably support the differential assembly 22. In at least one configuration, the differential carrier 42 may include a bearing support wall 60.

Referring to FIG. 2, the bearing support wall 60 may support bearings that may rotatably support other components of the axle assembly 10. For example, the bearing support wall 60 may support bearings that may rotatably support a drive pinion 80, bearings that may rotatably support a rotor of an electric motor, or both. The bearing support wall 60 may extend in an axial direction away from the axle housing 40 and may extend around and encircle the axis 70. The bearing support wall 60 may define a hole that may extend along or around the axis 70 and receive the drive pinion 80 and the bearings that rotatably support the drive pinion 80. The bearing support wall 60 may be integrally formed with the differential carrier 42 or may be a separate component that is secured to or fastened to the differential carrier 42.

The differential assembly 22 may be at least partially received in the center portion 50 of the housing assembly 20. The differential assembly 22 may be rotatable about a differential axis 90. The axis 70 may be disposed substantially perpendicular to the differential axis 90. The term "substantially perpendicular" is used herein to designate features or axes that are the same as or very close to perpendicular and includes features that are within ±2.5° of being perpendicular each other. The differential axis 90 may be the same as the wheel axis 14 or may differ from the wheel axis 14.

The differential assembly 22 may transmit torque to the axle shafts 24, wheel hubs 12, and wheels of the vehicle. The differential assembly 22 may be operatively connected to the axle shafts 24 and may permit the axle shafts 24 to rotate at different rotational speeds in a manner known by those skilled in the art. The differential assembly 22 may have a ring gear 100 that may have teeth that may be arranged around the differential axis 90 and that engage the drive pinion 80. Accordingly, the differential assembly 22 may receive torque from the drive pinion 80 via the ring gear 100 and transmit torque to the axle shafts 24.

The drive pinion 80 may be operatively connectable to the torque source 26. In addition, the drive pinion 80 may engage or mesh with the ring gear 100. For instance, the drive pinion 80 may have a gear portion that has teeth that may mesh with teeth of the ring gear 100 and a shaft portion that extends from the gear portion. In an axle assembly that includes a gear reduction module 30, the drive pinion 80 may operatively connect the gear reduction module 30 to the differential assembly 22. In at least one configuration, the drive pinion 80 may be rotatable about the axis 70 and may be rotatably supported inside another component, such as the bearing support wall 60.

Referring to FIG. 1, the axle shafts 24 may transmit torque from the differential assembly 22 to corresponding wheel hubs 12 and wheels. Two axle shafts 24 may be provided such that each axle shaft 24 extends through a different arm portion 52 of axle housing 40. The axle shafts 24 may extend along and may be rotatable about an axis, such as the wheel axis 14 or the differential axis 90, which may or may not be coaxially disposed. As an example, an axle shaft 24 may have a first end and a second end. The first end may be operatively connected to the differential assembly 22. The second end may be disposed opposite the first end and may be operatively connected to a corresponding wheel hub 12. Optionally, gear reduction may be provided between an axle shaft 24 and a wheel.

At least one torque source 26 may be provided with the axle assembly 10 or may be connected to the axle assembly 10. The torque source 26 may provide torque to the differential assembly 22 via the drive pinion 80 and a gear reduction module 30 as will be discussed in more detail below. A torque source 26 may be of any suitable type, such as an electric motor, an internal combustion engine, or combinations thereof. In the configuration shown, the torque source 26 is illustrated as being an electric motor or electric motor module that is mounted to the differential carrier 42. The electric motor module is illustrated as being disposed between the differential assembly 22 and the gear reduction module 30; however, other configurations are contemplated, such as providing the electric motor module and the gear reduction module 30 on opposite sides of the differential assembly 22. In at least one configuration, the electric motor module may include a motor housing 110, a coolant jacket 112, a stator 114, a rotor 116, at least one rotor bearing assembly 118, and a cover 120.

The motor housing 110 may extend between the differential carrier 42 and the cover 120. The motor housing 110 may be mounted to the differential carrier 42 and the cover 120. The motor housing 110 may extend around the axis 70 and may define a motor housing cavity 130.

The coolant jacket 112 may help cool or remove heat from the stator 114. The coolant jacket 112 may be received in the motor housing cavity 130 of the motor housing 110 and may encircle the stator 114.

The stator 114 may be received in the motor housing 110. For instance, the stator 114 may be received in the motor housing cavity 130. The stator 114 may be fixedly positioned with respect to the coolant jacket 112. For example, the stator 114 may extend around the axis 70 and may include stator windings that may be received inside and may be fixedly positioned with respect to the coolant jacket 112.

The rotor 116 may extend around and may be rotatable about the axis 70. The rotor 116 may be received inside the stator 114, the coolant jacket 112, and the motor housing cavity 130 of the motor housing 110. The rotor 116 may be rotatable about the axis 70 with respect to the differential carrier 42 and the stator 114. In addition, the rotor 116 may be spaced apart from the stator 114 but may be disposed in close proximity to the stator 114. The rotor 116 may extend around and may be supported by the bearing support wall 60.

One or more rotor bearing assemblies 118 may rotatably support the rotor 116. For example, a rotor bearing assembly 118 may encircle the bearing support wall 60 of the differential carrier 42 and may be received inside of the rotor 116. The rotor 116 may be operatively connected to the drive pinion 80. For instance, a coupling such as a rotor output flange 140 may operatively connect the rotor 116 to the gear reduction module 30, which in turn may be operatively connectable with the drive pinion 80.

The cover 120 may be mounted to the motor housing 110 and may be disposed opposite the axle housing 40 and the differential carrier 42. For example, the cover 120 may be mounted to an end of the motor housing 110 that may be disposed opposite the differential carrier 42.

The gear reduction module 30, if provided, may transmit torque between the torque source 26 and the differential assembly 22. As such, the gear reduction module 30 may operatively connect the torque source 26 and the differential assembly 22. The gear reduction module 30 may include one or more gear sets. A gear set may have any suitable configuration. For instance, a gear set may be provided with a countershaft arrangement, an epicyclic gear set arrangement, or the like. In FIG. 2, an example of an epicyclic gear set arrangement is shown in which one or more planet gears 150 may mesh with and revolve or rotate about a central sun gear 152. Each planet gear 150 may be rotatable about a corresponding axis that may be positioned at a constant or substantially constant radial distance from the axis about which the central sun gear 152 rotates. The planet gears 150 may be rotatably supported on a planet gear carrier 154 that may be connectable to the drive pinion 80, such as with a clutch 156. Torque may be transmitted between the torque source 26 and the drive pinion 80 via the one or more gear sets of the gear reduction module 30. Torque transmission may be bidirectional when the torque source 26 includes an electric motor. For instance, torque may be transmitted from the electric motor module to the drive pinion 80 for vehicle propulsion and may be transmitted from the drive pinion 80 to the electric motor module under various operating conditions, such as during regenerative braking.

The differential brake 32 may be mounted to the housing assembly 20. For example, the differential brake 32 may be mounted to the center portion 50 of the housing assembly 20. As is best shown in FIG. 2, the differential brake 32 may be disposed outside of the housing assembly 20. In at least one configuration, the differential brake 32 and the drive pinion 80 may be positioned on opposite sides of the differential assembly 22. The differential brake 32 may be operable to apply a brake torque that may slow or stop rotation of the rotatable braking component 170. The brake torque may also slow, stop or inhibit rotation of the differential assembly 22 and the drive pinion 80 when sufficient brake torque is provided. The differential brake 32 differs from the brake assemblies 28 previously discussed.

The differential brake 32 may be actuated in any suitable manner. For instance, the differential brake may be actuated with an electrical actuator, electromechanical actuator, hydraulic actuator, mechanical actuator, or the like.

The differential brake 32 may be of any suitable type. For instance, the differential brake 32 may be configured as a disc brake, drum brake, clutch such as a disc clutch, or the like. The differential brake 32 will primarily be described below in the context of a disc brake. In such a configuration, the differential brake 32 may include a brake carrier 160, a brake caliper 162, and one or more friction members 164.

The brake carrier 160 may facilitate mounting of the differential brake 32. For instance, the brake carrier 160 may be fixedly mounted to the housing assembly 20. The brake carrier 160 may receive and support the friction members 164 and may include an opening through which a rotatable braking component 170 may extend. For instance, the brake carrier 160 may cradle or support the bottom and lateral sides of a friction member 164. In at least one configuration, the brake carrier 160 may straddle the rotatable braking component 170 and may help position friction members 164 on opposite sides of the rotatable braking component 170.

The brake caliper 162 may be mounted to the brake carrier 160 and may support various components of the differential brake 32. In addition, the brake caliper 162 may help position the friction members 164 with respect to the rotatable braking component 170 to facilitate braking of the vehicle as will be discussed in more detail below. In at least one configuration, the brake caliper 162 may include a caliper housing 180 and a caliper bridge 182.

The caliper housing 180 may be moveably disposed on the brake carrier 160. For example, the caliper housing 180 may be slidable along a pair of guide pins that may be fixedly disposed on the brake carrier 160. The caliper housing 180 may receive or support various components that may facilitate actuation of a friction member 164. For instance, the caliper housing 180 may support a tappet that may protrude from an internal chamber of the caliper housing 180. The tappet may extend from the caliper housing 180 toward the rotatable braking component 170 to engage a friction member 164. The tappet may be moveable along an axis with respect to the caliper housing 180 such that the tappet may move toward and away from the rotatable braking component 170. As an example, an actuator may extend the tappet to actuate a friction member 164 that is disposed between the caliper housing 180 and the rotatable braking component 170 into engagement with the rotatable braking component 170. A reaction force may then move the caliper housing 180 and caliper bridge 182 with respect to the brake carrier 160 to actuate a friction member 164 that is disposed between the caliper bridge 182 and the rotatable braking component 170 into engagement with an opposite side of the rotatable braking component 170 to help slow rotation of the rotatable braking component 170.

The caliper bridge 182 may be fixedly positioned with respect to the caliper housing 180. The caliper bridge 182 may be integrally formed with the caliper housing 180 or may be a separate component that is mounted to the caliper housing 180.

One or more friction members 164 may be configured to engage a friction surface 190 of the rotatable braking component 170 to provide brake torque to slow or stop rotation of the rotatable braking component 170. In a disc brake configuration, the friction members 164 may be configured as brake pad assemblies that may be received in the brake carrier 160 and that may be disposed on opposite sides of the rotatable braking component 170 that is configured as a brake rotor. In such a configuration, a friction member 164 may include friction material 192 that is disposed on a backplate 194. The friction material 192 may engage the rotatable braking component 170 during braking and may be spaced apart from the rotatable braking component 170 when braking is not provided.

The rotatable braking component 170 may be disposed outside of the housing assembly 20. The rotatable braking component 170 may have any suitable configuration. For example, the rotatable braking component 170 may be a brake rotor in a disc brake configuration and may be a brake drum in a drum brake configuration. In the configuration shown in FIG. 2, the rotatable braking component 170 may be rotatable with a second drive pinion 200. For instance, the rotatable braking component 170 may be fixedly mounted to the second drive pinion 200 and may be rotatable about an axis with the second drive pinion 200.

The second drive pinion 200 may be spaced apart from the drive pinion 80. The second drive pinion 200 may engage or mesh with the ring gear 100. For instance, the second drive pinion 200 may have teeth that may mesh with the teeth of the ring gear 100. The second drive pinion 200 may be rotatable about an axis 202. The axis 202 may be disposed substantially perpendicular to the differential axis 90. In addition, the axis 202 may differ from the axis 70 about which the drive pinion 80 is rotatable or may be the same as the axis 70 about which the drive pinion 80 is rotatable.

The second drive pinion 200 may be positioned on an opposite side of the differential assembly 22 from the torque source 26, from the drive pinion 80, or both. In addition, the second drive pinion 200 and the drive pinion 80 may be positioned on opposite sides of the differential axis 90 or opposite sides of a vertical plane in which the differential axis 90 is disposed from the perspective shown in FIGS. 2 and 3.

The second drive pinion 200 may be rotatably supported by one or more bearing assemblies 210. A bearing assembly 210 may be disposed on the housing assembly 20. For example, a bearing assembly 210 may be received in a hole 212 in the housing assembly 20 through which the second drive pinion 200 may extend. The hole 212 and the bearing assembly 210 may be disposed opposite the drive pinion 80 or on an opposite side of the differential assembly 22 from the drive pinion 80.

Engagement of one or more friction members 164 of the differential brake 32 with the rotatable braking component 170 with a sufficient amount of brake torque may stop rotation of the rotatable braking component 170 and the second drive pinion 200, which in turn may inhibit rotation of the ring gear 100, the differential assembly 22, the axle shafts 24, wheel hubs 12, and wheels mounted to the wheel hubs 12 that support the vehicle. In addition, stopping rotation of the rotatable braking component 170 may inhibit rotation of the drive pinion 80. The rotatable braking component 170 and the second drive pinion 200 may be free to rotate in response to rotation of the ring gear 100 when brake torque is not provided.

In a configuration in which the differential brake 32 is configured as a drum brake, the rotatable braking component 170 may be configured as a brake drum that may be mountable to and may rotate with the second drive pinion 200 and one or more friction members 164 configured as brake pad assemblies or brake shoes may be received inside and may be configured to engage the brake drum to provide brake torque in a manner known by those skilled in the art.

Referring to FIG. 3, another configuration is shown that is similar to the configuration shown in FIG. 2. In this configuration, the second drive pinion 200 may be omitted and may be replaced by a connecting shaft 220.

The connecting shaft 220 may be spaced apart from the differential assembly 22. The connecting shaft 220 may be rotatably connected to the drive pinion 80. For instance, the connecting shaft 220 may be rotatable about the axis 70 with the drive pinion 80. In such a configuration, the connecting shaft 220 and the drive pinion 80 may be coaxially disposed and the connecting shaft 220 may extend from the drive pinion 80. In at least one configuration, the connecting shaft 220 may be received in an opening in the drive pinion 80 that may extend from an end of the drive pinion 80 from which the gear portion of the drive pinion 80 may extend. The connecting shaft 220 may be fixedly coupled to the drive pinion 80 in any suitable manner. For instance, the connecting shaft 220 and the drive pinion 80 may have a splined connection, interference fit, be attached with one or more fasteners, or the like. In FIG. 3, the connecting shaft 220 is illustrated as being a two-piece shaft in which a smaller diameter portion extends from the drive pinion 80 to the portion that supports the rotatable braking component 170; however, it is contemplated that the connecting shaft 220 may be a unitary one-piece component, may not have a smaller diameter portion, or combinations thereof.

It is also contemplated that the connecting shaft 220 and the drive pinion 80 may not be coaxially disposed. In such a configuration, the connecting shaft 220 and the drive pinion 80 may be rotatable about parallel or substantially parallel axes that may be offset from each other and may be interconnected by gears. For instance, a first gear that is rotatable with the drive pinion 80 may mesh with a second gear that is rotatable with the connecting shaft 220. The term "substantially parallel" as used herein means the same as or very close to parallel and includes features or axes that are within ±2.5° of being parallel each other.

The connecting shaft 220 may be rotatably supported by one or more bearing assemblies 210. A bearing assembly 210 may be disposed on the housing assembly 20. For example, a bearing assembly 210 may be received in a hole 212 in the housing assembly 20 through which the connecting shaft 220 may extend. The hole 212 and the bearing assembly 210 may be disposed opposite the drive pinion 80 or on an opposite side of the differential assembly 22 from the drive pinion 80.

The rotatable braking component 170 may be rotatable with the connecting shaft 220. As such, the rotatable braking component 170 may be rotatable about the axis 70 with the drive pinion 80 and the connecting shaft 220 when the drive pinion 80 and the connecting shaft 220 are coaxially disposed. Alternatively, the rotatable braking component 170 may be rotatable with the connecting shaft 220 about an axis that differs from the axis 70 about which the drive pinion 80 rotates when the drive pinion 80 and the connecting shaft 220 are not coaxially disposed.

Engagement of one or more friction members 164 of the differential brake 32 with the rotatable braking component 170 with a sufficient amount of brake torque may stop rotation of the rotatable braking component 170 and the connecting shaft 220, which in turn may inhibit rotation of the drive pinion 80, the ring gear 100, the differential assembly 22, the axle shafts 24, wheel hubs 12, and wheels mounted to the wheel hubs 12 that support the vehicle. The rotatable braking component 170 and connecting shaft 220 may be free to rotate in response to rotation of the ring gear 100 when brake torque is not provided.

In a configuration in which the differential brake 32 is configured as a drum brake, the rotatable braking component 170 may be configured as a brake drum that may be mountable to and may rotate with the connecting shaft 220 and one or more friction members 164 configured as brake pad assemblies or brake shoes may be received inside and may be configured to engage the brake drum to provide brake torque in a manner known by those skilled in the art.

An axle assembly as described above may provide braking functionality, such as parking brake functionality, with a differential brake that operable independent of the brake assemblies that are configured to brake a wheel hub. As such, parking brake functionality may be provided when the wheel brake assemblies or an associated wheel brake actuator is inoperative, such as may be the case when the vehicle is turned off or when the wheel brake assemblies are not configured to provide parking brake functionality, such as may be the case with hydraulically actuated wheel brake assemblies. Such a configuration may allow braking functionality to be provided independent of operation of a power source for a wheel brake actuator. Providing parking brake functionality may inhibit movement of the vehicle when a torque source is turned off or is inactive. In a configuration in which the torque source is an electric motor, the differential brake may be used to inhibit vehicle movement rather than by providing braking with the electric motor, which may help reduce energy consumption and avoid overheating of the electric motor. A single differential brake may provide parking brake functionality and may do at a lower cost or with lower energy consumption than a parking brake that is disposed at or near the wheel hub.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a differential assembly that is rotatable about a differential axis, the differential assembly having a ring gear;
    a drive pinion that meshes with the ring gear and that is operatively connectable to a torque source;
    a connecting shaft that is spaced apart from the differential assembly and is rotatably connected to the drive pinion; and
    a differential brake that is operable to apply a brake torque to inhibit rotation of the connecting shaft and the differential assembly, wherein the differential brake and the drive pinion are positioned on opposite sides of the differential assembly.

2. The axle assembly of claim 1 wherein the connecting shaft is rotatable with the drive pinion.

3. The axle assembly of claim 1 wherein the drive pinion and the connecting shaft are rotatable about an axis.

4. The axle assembly of claim 3 wherein the differential axis is disposed above the axis.

5. The axle assembly of claim 1 wherein the connecting shaft is rotatable about an axis that is disposed substantially perpendicular to the differential axis.

6. The axle assembly of claim 1 further comprising a rotatable braking component that has a friction surface and that is rotatable with the connecting shaft, wherein the differential brake has a friction member that is engageable with the friction surface to provide the brake torque.

7. The axle assembly of claim 6 wherein the drive pinion, the connecting shaft, and the rotatable braking component are rotatable together about an axis.

8. The axle assembly of claim 1 wherein the axle assembly includes a housing assembly that receives the differential assembly and the differential brake is disposed outside of the housing assembly.

9. The axle assembly of claim 8 wherein the connecting shaft is rotatably supported by a bearing assembly that is disposed on the housing assembly and that is disposed opposite the drive pinion.

10. The axle assembly of claim 1 wherein the differential assembly is positioned between the differential brake and the torque source.

11. The axle assembly of claim 10 wherein the torque source is an electric motor.

12. An axle assembly comprising:
    a differential assembly that is rotatable about a differential axis, the differential assembly having a ring gear;
    a drive pinion that meshes with the ring gear and that is operatively connectable to a torque source;
    a connecting shaft that is spaced apart from the differential assembly and is rotatably connected to the drive pinion;
    a differential brake that is operable to apply a brake torque to inhibit rotation of the connecting shaft and the differential assembly; and
    a housing assembly that receives the differential assembly, wherein the housing assembly includes an axle housing that has a center portion that receives the differential assembly and first and second arm portions that extend in opposite directions from the center portion, wherein the first and second arm portions each receive an axle shaft and support a wheel hub and a brake assembly that is configured to brake the wheel hub, and wherein the differential brake is disposed outside of the housing assembly.

13. The axle assembly of claim 12 wherein the drive pinion and the connecting shaft are rotatable about an axis.

14. The axle assembly of claim 12 wherein the differential assembly is positioned between the differential brake and the torque source.

15. The axle assembly of claim 14 wherein the torque source is an electric motor.

16. An axle assembly comprising:
a differential assembly that is rotatable about a differential axis, the differential assembly having a ring gear;
a drive pinion that meshes with the ring gear and that is operatively connectable to a torque source;
a connecting shaft that is spaced apart from the differential assembly and is rotatably connected to the drive pinion, wherein the connecting shaft is rotatable about an axis that is disposed substantially perpendicular to the differential axis; and
a differential brake that is operable to apply a brake torque to inhibit rotation of the connecting shaft and the differential assembly, wherein the differential brake and the drive pinion are positioned on opposite sides of the differential assembly.

17. The axle assembly of claim 16 wherein the drive pinion and the connecting shaft are rotatable about the axis.

18. The axle assembly of claim 16 wherein the differential brake is spaced apart from and does not contact the differential assembly.

19. The axle assembly of claim 16 wherein the differential assembly is positioned between the differential brake and the torque source.

20. The axle assembly of claim 19 wherein the torque source is an electric motor.

* * * * *